(12) United States Patent
Gupta

(10) Patent No.: US 9,367,574 B2
(45) Date of Patent: Jun. 14, 2016

(54) EFFICIENT QUERY PROCESSING IN COLUMNAR DATABASES USING BLOOM FILTERS

(71) Applicant: Amazon Technologies, Inc., Seattle, WA (US)

(72) Inventor: Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/635,844

(22) Filed: Mar. 2, 2015

(65) Prior Publication Data
US 2015/0169655 A1   Jun. 18, 2015

Related U.S. Application Data

(63) Continuation of application No. 13/773,476, filed on Feb. 21, 2013, now Pat. No. 8,972,337.

(51) Int. Cl.
*G06F 17/00* (2006.01)
*G06F 17/30* (2006.01)

(52) U.S. Cl.
CPC .... *G06F 17/30315* (2013.01); *G06F 17/30563* (2013.01); *G06F 17/30592* (2013.01)

(58) Field of Classification Search
CPC ............... G06F 17/30315; G06F 17/30563; G06F 17/30592
USPC ........................................................ 707/602
See application file for complete search history.

(56) References Cited

U.S. PATENT DOCUMENTS

| 5,990,810 | A | 11/1999 | Williams |
| 7,103,608 | B1 * | 9/2006 | Ozbutun ........... G06F 17/30492 |
| | | | 707/604 |
| 7,548,908 | B2 | 6/2009 | Fu et al. |
| 8,341,172 | B2 | 12/2012 | Dettinger et al. |
| 8,498,995 | B1 | 7/2013 | Gond et al. |
| 8,549,004 | B2 | 10/2013 | Lakshminarayan et al. |
| 8,671,111 | B2 | 3/2014 | Dantressangle et al. |
| 8,832,142 | B2 | 9/2014 | Marwah et al. |
| 8,972,337 | B1 | 3/2015 | Gupta |
| 2009/0228433 | A1 | 9/2009 | Aguilar Saborit et al. |

(Continued)

OTHER PUBLICATIONS

IEEE, Loizos Michael, Wolfgang Nejdl, Odysseas Papapetrou, Wolf Siberski, Improving Distributed Join Efficiency with Extended Bloom Filter Operations, pp. 187-194, May 2007, 21st International Conference on Advanced Information Networking and Applications (AINA) '07.

(Continued)

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

A bloom filter is generated for efficient query processing for unsorted data in a column of a columnar database. Bloom filters represented as bitmaps are generated for data blocks storing data for a column of a columnar database table. An indication of a query directed toward the column is received and the bloom filter for each data block is examined to determine which ones of the data blocks do not need to be read in order to service the query for the select data. Data is then read from the data blocks storing data for the column excepting the ones which do not need to be read.

20 Claims, 11 Drawing Sheets

(56) References Cited

U.S. PATENT DOCUMENTS

| | | |
|---|---|---|
| 2010/0082648 A1 | 4/2010 | Potapov et al. |
| 2012/0084287 A1 | 4/2012 | Lakshminarayan et al. |
| 2012/0084305 A1 | 4/2012 | Inoue et al. |
| 2012/0158756 A1 | 6/2012 | Jimenez et al. |
| 2013/0054531 A1 | 2/2013 | Susairaj et al. |
| 2013/0166557 A1 | 6/2013 | Fricke et al. |
| 2014/0040317 A1 | 2/2014 | Valenza et al. |
| 2014/0279961 A1 | 9/2014 | Schreter et al. |

OTHER PUBLICATIONS

ACM, Dominik Slezak, Jakub Wroblewski, Victoria Eastwood, Piotr Synak, Brighthouse: An Analytic data Warehouse for Ad-hoc Queries, Aug. 2008, pp. 1337-1345, Proceedings of the VLDB Endowment vol. 1 Issue 2.

Larson, Per-Ake, et al., "SQL Server Column Store Indexes", SIGMOD '1 0, Athens, Greece, Jun. 12-16, 2011, pp. 1177-1184.

Guo, Sijie, et al., "Mastiff: A MapReduce-based System for Time-based Big Data Analytics", CLUSTER 2012, Beijing, China, Sep. 24-28, 2012, pp. 72-80.

Cohen, Saar, et al., "Spectral Bloom Filters", SIGMOD 2003, San Diego, CA, Jun. 9-12, 2003, pp. 241-252.

Canim, Mustafa, et al., "Buffered Bloom Filters on Solid State Storage", ADMS 2010 I VLDB 2010, Singapore, Sep. 13, 2010, pp. 1-8.

Rajwar, Ravi, et al., "Virtualizing Transactional Memory", ISCA 2005, Madison, WI, Jun. 4-8, 2005, pp. 494-505.

Bauer, Daniel, et al., "Bringing Efficient Advanced Queries to Distributed Hash Tables", LCN 2004, Tampa, FL, Nov. 16-18, 2004, pp. 1-8.

Tsuchiya, Yoshihiro, et al., "DBLK: Deduplication for Primary Block Storage", MSST '11, IEEE Computer Society, Washington, DC, © 2011, pp. 1-5.

"Bloom filter", Wikipedia, Downloaded from: en.Wikipedia.org/wiki/Bioom_filter on Oct. 7, 2014, pp. 1-19.

\* cited by examiner

EFFICIENT QUERY PROCESSING IN COLUMNAR DATABASES USING BLOOM FILTERS

This application is a continuation of U.S. patent application Ser. No. 13/773,476, filed Feb. 21, 2013, now U.S. Pat. No. 8,972,337, which is hereby incorporated by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

One such technology involves modifying the orientation or arrangement of data as it is stored in a database table using a column oriented database table (often referred to as "columnar") to reduce the number of access operations required to manage it. Typically, access operations, such as various inputs (e.g., writing data) and output (e.g., reading data), prove to be the most costly and least efficient when storing and managing data. Columnar databases may for certain types of data drastically reduce the number of access operations, when, for instance, the database system is responding to a query for information that occurs predominately in a column of a database table rather than a row of a database table. Yet, even with the advent of technologies such as columnar database tables, the continued growth of collected information requires further optimizations for the storage and management of data.

Figure 1:
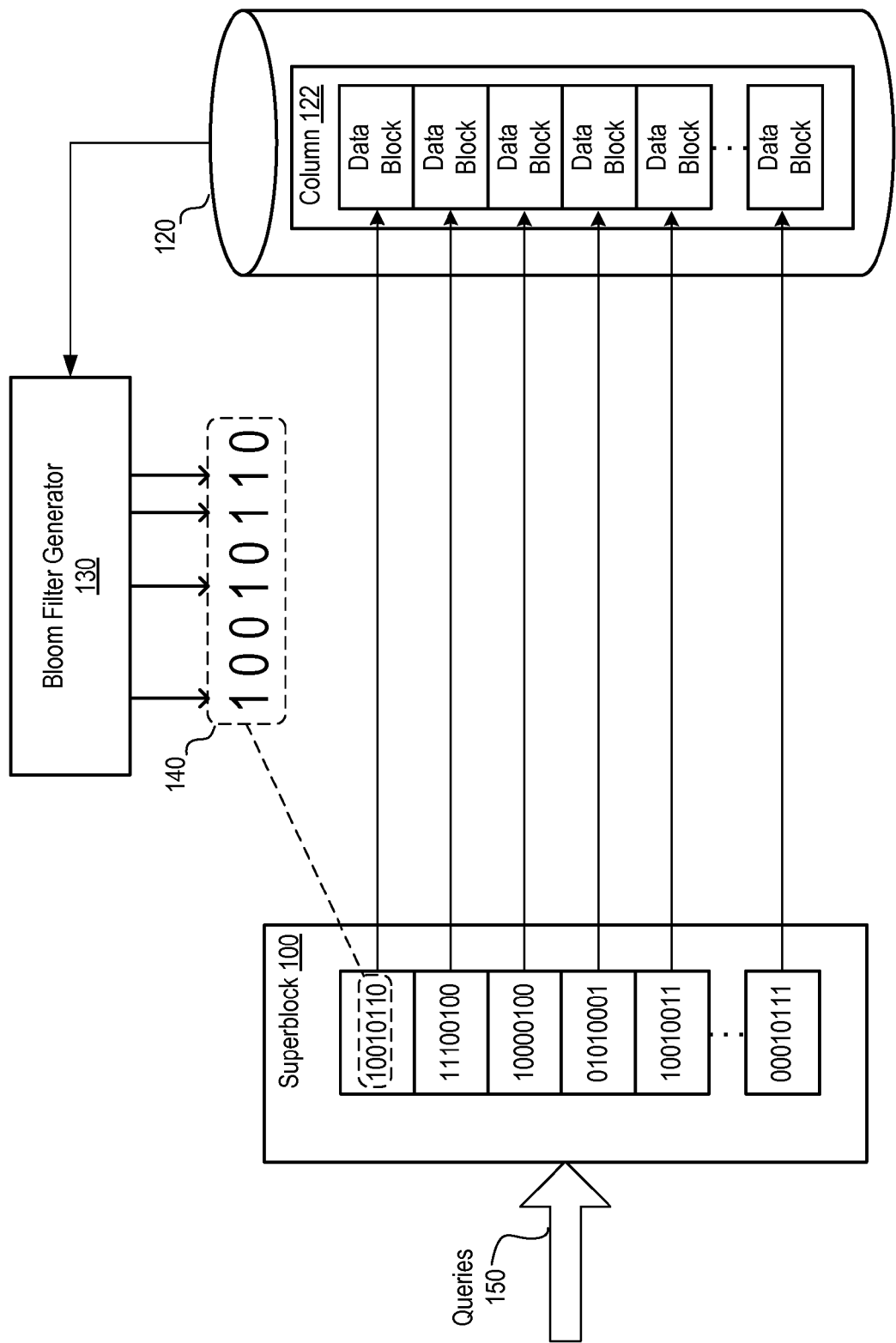
FIG. 1 illustrates a dataflow block diagram of efficient query processing using a bloom filters for data blocks of a column of a columnar database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of efficient query processing using bloom filters for a column of a columnar database are described herein. A database management service, such as a distributed data warehouse system, or other database management system may implement column oriented database tables (hereinafter referred to as "columnar database tables") to provide efficient data management for clients. Typically, data in the columnar database table is sorted according to one column of the database table, such as by date. When determining whether or not blocks sorting data for the column along which the data is sorted, different ranges for each data block may be stored or estimated, allowing for queries to only direct the reading of data blocks with the requested data known to be likely stored in the data block. However, such a technique may only be applied when responding to queries for data in the column along which the columnar database table is sorted, as only one column may be sorted at a time.

A bloom filter is a probabilistic data structure that indicates whether a given value is likely within a set of values, such as the data values stored in a data block. A bloom filter generated based, at least in part, on the data values stored in a data block may provide sufficient selectivity (e.g., discrimination or probability of a data value in a particular bucket) to process queries, such that when a query is received the bloom filters for the data blocks of the column may be used to determine which data blocks storing data for the column do not need to be read. Less read operations (or other various access operations) may, for example, then be executed to obtain data to service a received query. Thus, by using bloom filters for data blocks of a column of a columnar database to process queries, some embodiments may provide more efficient management of and access to large amounts of data.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

Figure 2:
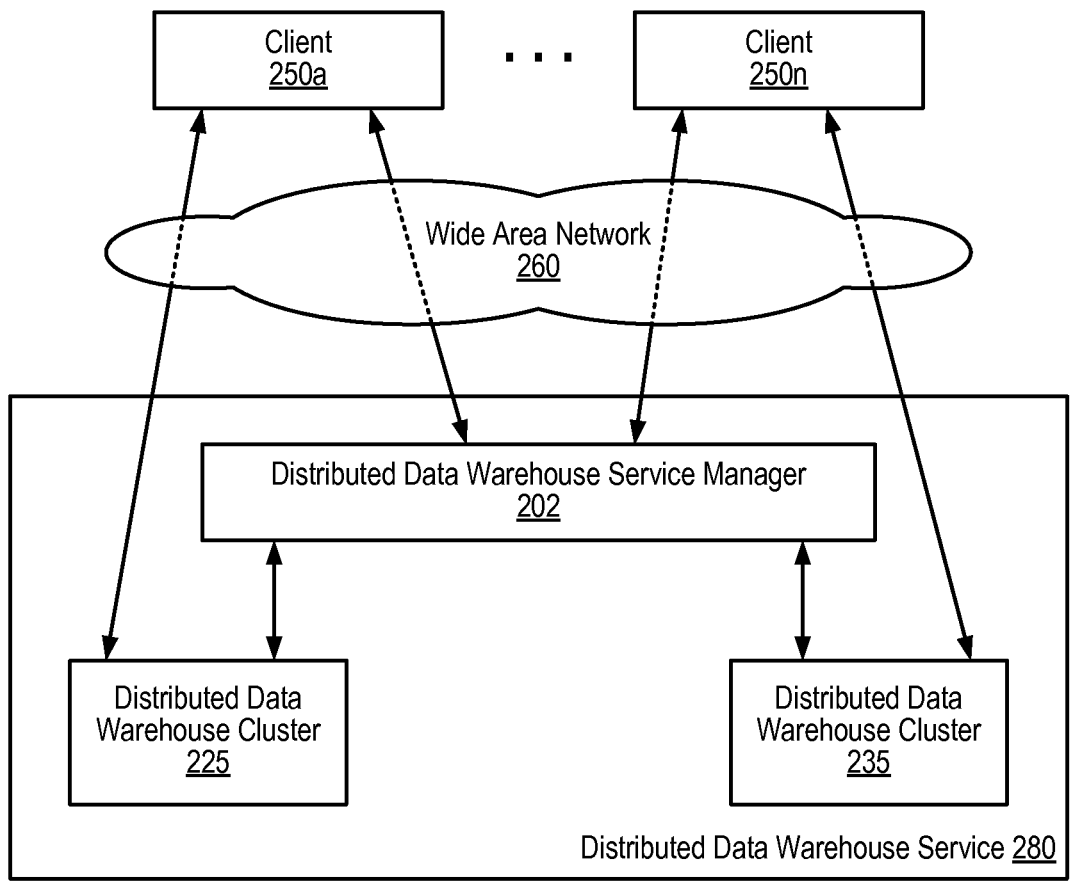
FIG. 2 is a block diagram illustrating an example distributed database warehouse service, according to some embodiments.

A data management service, such as a distributed data warehouse service discussed below with regard to FIGS. 2 through 4, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, the column field values for many more rows may be retrieved than if each data block stored an entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar database table, bloom filters may be generated to indicate the data values likely stored in data blocks storing data for a column of a columnar database which may be used to determine data blocks that do not need to be read when responding to a query.

FIG. 1 illustrates a dataflow block diagram of efficient query processing using a bloom filters for data blocks of a column of a columnar database, according to some embodiments. For data stored in data blocks of column 122 in storage 120, bloom filter generator 130 may generate a bloom filter 140. The bloom filter 140 may be stored in a respective entry for the data block in a superblock data structure 100. In order to service queries 150 directed to the column 122 for select data, the respective entries in the superblock data structure 100 may be examined to determine which blocks do not need to be read.

Storage 120 may be one or more storage devices, such as storage disk devices or other type of storage devices configured to store data for a columnar database table. Storage 120 may be configured to store data for multiple columns, including column 122. Data may, for instance, be a list of dates, cites, quantities, or web metrics and, more generally, any other type or form of data value capable of storage in a data block for a column of a columnar database table. In various embodiments, the data values stored in a column are unsorted. A data block may be a unit of data storage (e.g., a data page), a logical abstraction, or physical block of storage that stores these data values in a database or other storage system. A columnar database table may be a column-oriented storage system for data configured to store data values of a column together. In at least some embodiments, storage 120 may be distributed across multiple different nodes in a distributed database system.

In some embodiments, bloom filter generator 130 may generate bloom filter 140 based, at least in part, on the data values of data stored in (or to be stored in) a data block of column 122. A bitmap may represent the bloom filter. For example, as illustrated in FIG. 1, the first entry in superblock data structure 100 corresponds to the first data block in column 122. The bitmap stored in the first entry, "10010110," represents the bloom filter generated for the first data block in column 122. Bloom filter generator 130 may generate the bloom filter 140 by determining a bloom filter size based, at least in part, on a number of possible data values stored in the data block. For instance, a data block in column 122 may store 4 values, and if the bloom filter size is determined to be 2 times the number of values possibly stored in the first data block, then (as illustrated) the bitmap may be twice the number of values, 8 values. The bitmap may then be generated to represent the bloom filter and include bits corresponding to the bloom filter size. The bitmap may be populated or set with different patterns of set bits based, at least in part, on the data to be stored in the data. For example, in some embodiments multiple hash functions may be applied to data values of the data, and locations in the bitmap corresponding to the out of the hash functions may be set to generated the different patterns of set bits.

Bloom filters, such as bloom filter 140, may be stored in a block metadata data structure, such as superblock data structure 100, which stores information about the data blocks in column 122. Each data block may have a respective entry in the superblock data structure 100. Queries 150 for select data stored in column 122 in storage 120 may be received. These queries may indicate particular data values in the select data to be retrieved or manipulated. In response to receiving queries 150, the bloom filters in the superblock data structure 100 may be examined. The patterns of set bits in the bloom filters may indicate whether a given value is stored in the data block corresponding to the bloom filter. For example, if the queried data value is 3, and the bit pattern locations for the value 3 may be determined using the same hash functions used to create the bloom filter. If the output of the hash functions applied to the value 3 corresponds to the first, fourth, and sixth locations in the bitmap, then by examining the first entry in superblock 100, "10010110," all three locations are set, indicating that the data value of 3 may be stored in the corresponding data block in column 122. If the second entry of the superblock data structure 100 is examined, "11100100," then only the first and sixth locations are set, indicating that the data value of is not located in the data block corresponding to the second entry in the superblock data structure 100. In at least some embodiments, the bloom filters generated for the data blocks may be used for other types of query processing, such as data join queries with data from other database tables.

In some embodiments, as new data for a column is received, new bloom filters may be generated with different patterns of set bits in the bitmap which indicate data values not stored in the data block. Alternatively, in at least some embodiments, additional data may be added to one of the data blocks and the bloom filter may be for the data block may be updated to include the new data. In at least some embodiments, an indexing event for the column of the columnar database table may be detected. This indexing event may, in some embodiments, be determined by evaluating the selectivity of the bloom filters to determine if the selectivity falls below a certain selectivity threshold. The number and/or type of queries, such as range queries which request a range of data values, may also trigger an indexing event. In response to the indexing event, a probabilistic data structure (such as a bitmap generated from a height-balanced histogram of the data stored in the column) may be generated and used in place of the bloom filter for the data block.

Embodiments of efficient query processing using bloom filters for a column of a columnar database may be implemented in a variety of different database management systems. Data management services, such as distributed data warehouse services or other database services offered to clients, may implement multi-level compression for client data stored with the data management service. Similarly client owned, operated, or controlled database systems may also implement a multi-level compression scheme. More generally, any system that stores data in a columnar database table may implement various embodiments of efficient query processing using a height-balanced histogram for a column of a columnar database, and thus, the previous examples need not be limiting as to various other systems envisioned.

Implementing Height-Balanced Histograms in a Distributed Data Warehouse System

As discussed above, various clients (or customers, organizations, entities, or users) may wish to store and manage data using a data management service. FIG. 2 illustrates an example distributed data warehouse system that may provide data management services to clients, according to some embodiments. Specifically, distributed data warehouse clusters may respond to store requests (e.g., to write data into storage) or queries for data (e.g., such as a Server Query Language request (SQL) for select data), along with many other data management or storage services.

Multiple users or clients may access a distributed data warehouse cluster to obtain data warehouse services. Clients which may include users, client applications, and/or data warehouse service subscribers), according to some embodiments. In this example, each of the clients 250a through 250n is able to access distributed data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 11, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 11. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4B. Clusters may be configured to receive requests and other communications over WAN 260 from clients, such as clients 250a through 250n. A cluster may be configured to receive requests from multiple clients via the network endpoint of the cluster.

In some embodiments, distributed data warehouse service 280 may be implemented as part of a web service that allows users to set up, operate, and scale a data warehouse in a cloud computing environment. The data warehouse clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 11. Different subsets of these computing devices may be controlled by distributed data warehouse service manager 202. Distributed data warehouse service manager 202, for example, may provide a cluster control interface to clients, such as clients 250a through 250n, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

Figure 3:
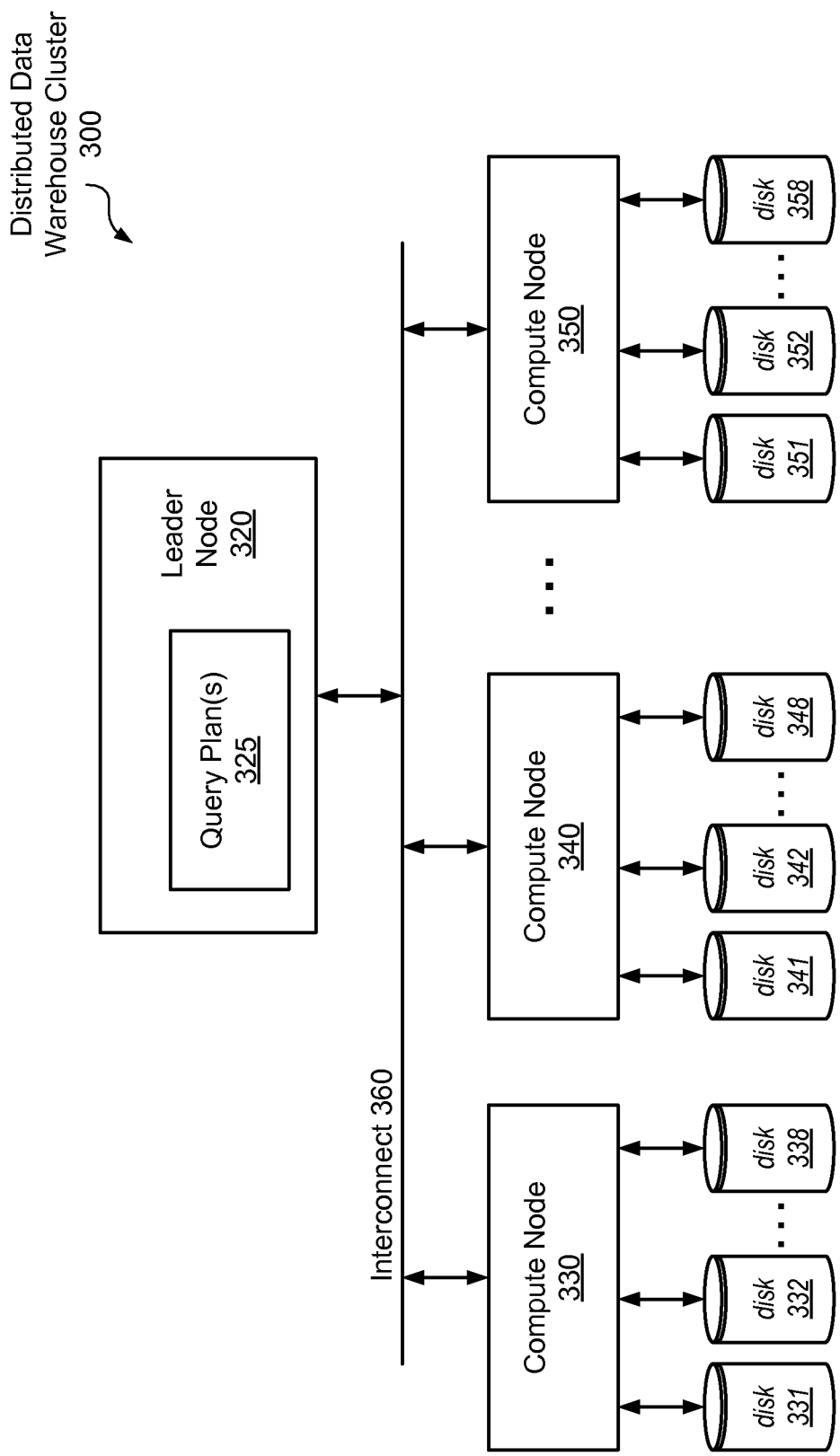
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250a through 250n discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes, may for example, be implemented on servers or other computing devices, such as those described below with regard to computer system 1000 in FIG. 11, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space, such as illustrated in FIG. 4, in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Figure 4:
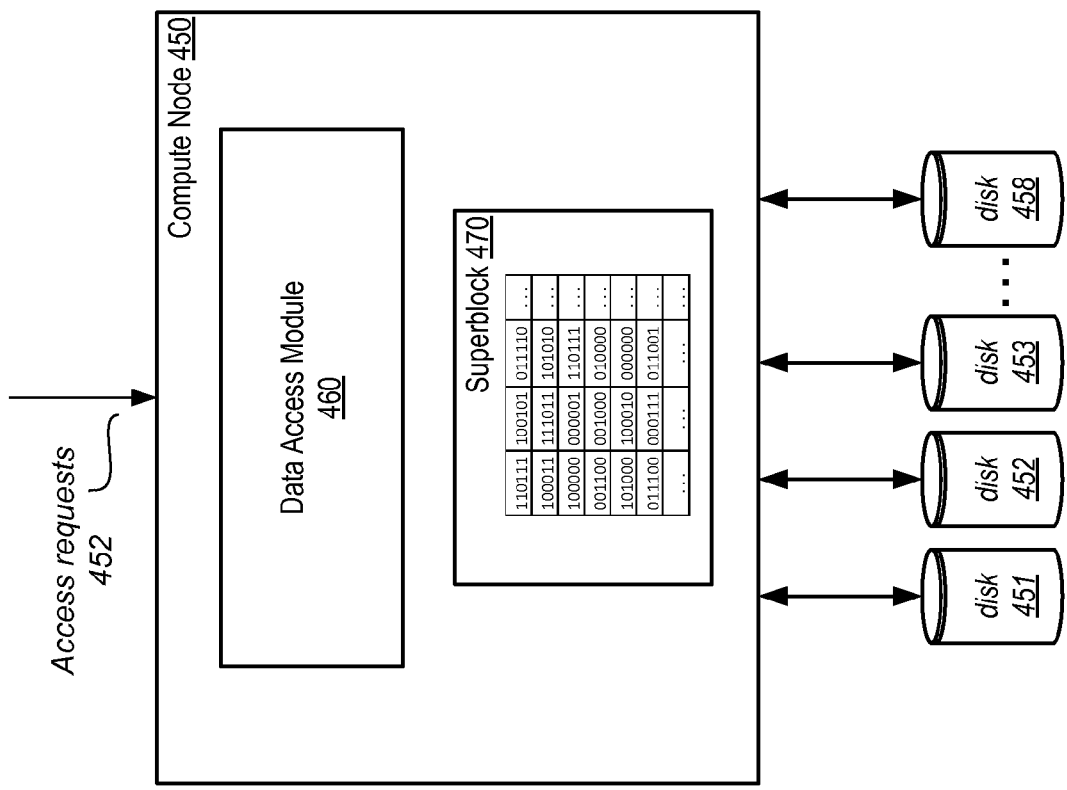
FIG. 4 is a block diagram illustrating an example compute node, according to some embodiments.

FIG. 4 illustrates an example of a compute node, according to some embodiments. Access requests 452, such as the various queries and messages sent to a leader node, such as leader node 320, and sent from a leader node to a compute node, may be received at compute node 450. A data access module 460, such as described in further detail below with regard to FIG. 5, may process access requests, directing reads, writes, and other access operations to disks 451 through 458. Various different hardware and software devices may be used singly or in combination to implement query execution module 460. When processing queries, data access module 460 may examine the bloom filter for each data block storing data for the column to determine the data blocks which do not need to be read in order to service the query, and then read the data blocks storing data for the column excepting those data blocks which do not need to be read.

In some embodiments, a compute node 450 may also include a superblock data structure 470, such as the superblock data structure described above, stored locally at the compute node or stored remotely, but accessible to the compute node, which may include respective entries for the data blocks stored on the compute node 450 which store block metadata including bloom filters, as well as other information, for the data blocks. Note, however, that in some embodiments, metadata for data blocks may be stored in multiple different locations, such as in the data block itself, or in other individual data structures. Therefore, the superblock data structure 470 is not intended to be limiting as to the various other structures, locations, methods, or techniques which might be applied to preserve metadata information for the data block.

Figure 5:
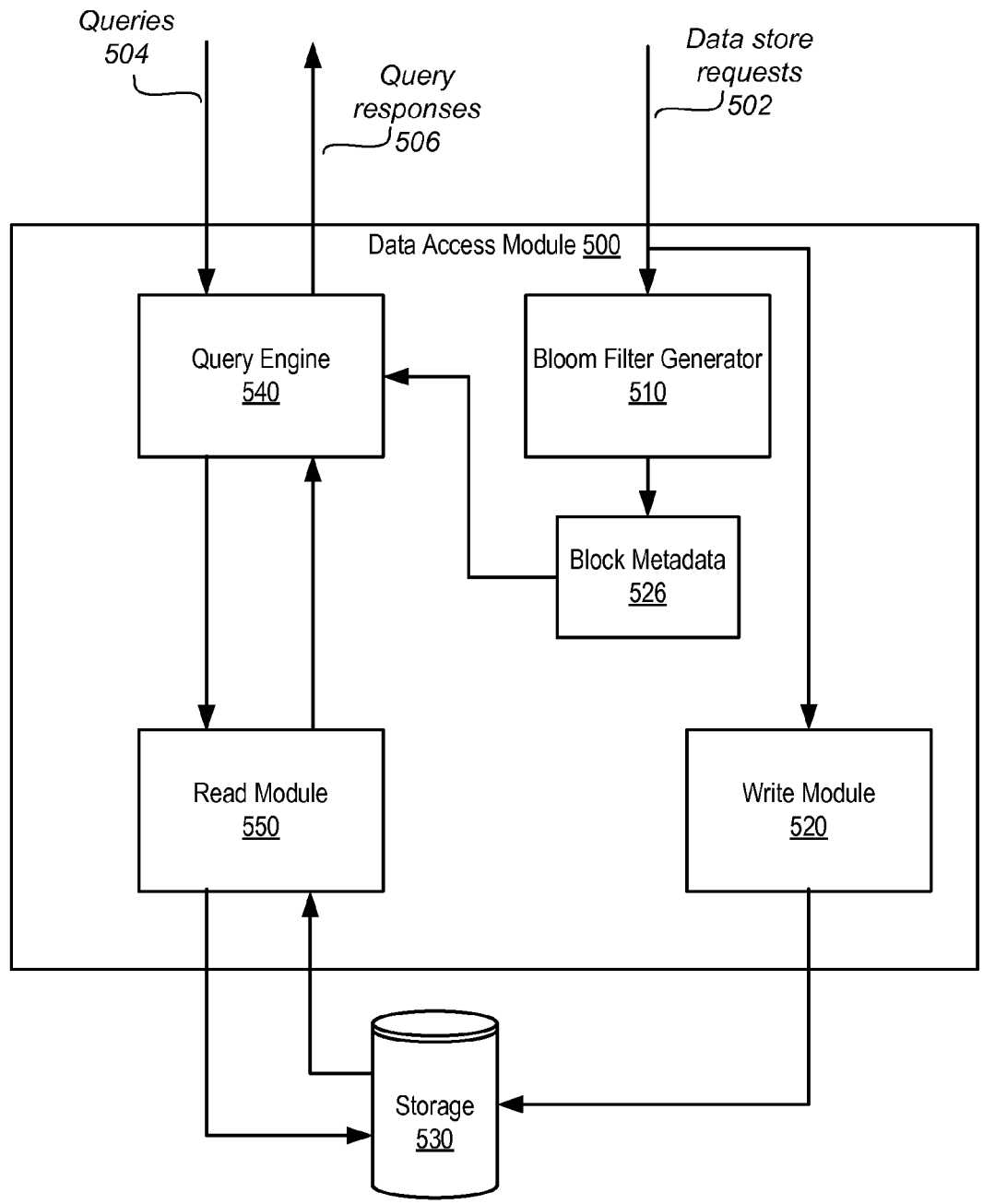
FIG. 5 is a block diagram illustrating an example data access module that implements bloom filters for query processing, according to some embodiments.

As discussed above, a compute node may be configured to receive access requests, such as queries, storage operations, and other data management operations. FIG. 5 is a block diagram illustrating an example data access module that implements bloom filters for query processing, according to some embodiments. Queries 504 and data store requests 502, or indications of queries or data store requests, may be received as inputs to data access module 500. Data access module 500 may communicate with storage 530, which may store a plurality of data blocks for multiple columns of a columnar database table. Data for the multiple columns may be stored in the data blocks in storage 530, and data access module 500 may be configured to both store this data and read this data from storage.

Data access module 500 may be implemented on a compute node, such as compute node 450 described above with regard to FIG. 4. Various different configurations of hardware and software components may be used to implement the data access module 500 as well as the components or modules illustrated within. Also note that, although different modules or components are illustrated within data access module 500 as one or more distinct modules or devices, these various components may be combined together, located differently, or alternatively configured to implement using bloom filters for query processing in a columnar database table, and therefore, the following description of FIG. 5 is not intended to be limiting as to the various other ways a data access module or similar module or device may be implemented.

Data store requests 502 which may include data to be stored in a data block for a column of the columnar database table stored in storage 530. For example, the data for storage in a data block in storage 530 may be obtain the data via an Open Database Connectivity (ODBC) and/or Java Database Connectivity (JDBC) driver interface or other component that is configured to receive storage request information and data for storage. Bloom filter generator 510 may receive as input the data for one or more data blocks to be stored for a column in storage 530. Although not illustrated, in at least some embodiments, data obtained from data blocks in storage may also be received as input at bloom filter generator 530. For example, another probabilistic data structure or indexing technique may be used for data blocks, and a switch to bloom filters for the data blocks may be indicated (e.g., by automatic detection, user-selection, etc.). Thus, the already stored data may also be received as input at the bloom filter generator 510 in order to generate bloom filters for the already stored data.

Upon receipt of the data for a data block, bloom filter generator 510 may generate a bloom filter for the data block. As discussed above, a bloom filter may be a probabilistic data structure that indicates whether a given value is a member of a set of data, such as the data block. The generated bloom filter may be represented as a bitmap, such as an array of bits. Different patterns of set bits in the bitmap may indicate whether a given value is stored in the data block. The number of bits in the bitmap may be determined according to the number of possible values that may be stored in the data block. For example, in some embodiments, the number of bits in the bitmap may be a factor of the number of possible data values, such as factor of 10. The bitmap may be populated (or the bits may be set) by applying multiple hash functions to the data values of the data to be stored (or stored) in the data block, and setting bits in the locations in the bitmap corresponding to the output of the hash function. For instance, if the output of the hash functions applied to a given value corresponds to locations 1, 22, 39, and 76 in the bitmap, then the bits in the bitmap at locations 1, 22, 39, and 76 will be set (e.g., stored with a value of "1").

In some embodiments, bloom filter generator 510 may receive as input additional data to be stored in a data block that already stores data, and that already has a bloom filter generated for the data block. Bloom filter generator 510 may update the bloom filter for the data block to include the additional data. For example, bloom filter generator 510 may apply the multiple hash functions previously used to generate the bloom filter to the data values of the additional data to be stored in the data block, and set bits in the locations in the bitmap corresponding to the output of the hash function.

Bloom filter generator 510 may store, update, or send the bloom filters generated for data blocks to block metadata 526. Block metadata 526 may be aggregated metadata for the blocks in storage 530, such as the superblock data structure 470 described above with regard to FIG. 4. Alternatively, in some embodiments, block metadata 526 may be distributed in different locations for different blocks, or stored in a location remote from, yet accessible to, the data access module.

A write module 520 may also be implemented by data access module 500 to store the data for data blocks in the data blocks in storage 530. In some embodiments, write module 520 (or another module or modules, such as the bloom filter generator 510) may be configured to update block metadata 526 with other metadata for the data stored in the data block.

Data access module 500 may also receive queries 504, or indications of queries, such as queries for select data stored in storage 530. For example, a leader node, such as leader node 320 described above with regard to FIG. 3, may receive a query from a storage client, and generate a query execution plan which sends the query to a compute node implementing data access module 500. Data access module 500 may implement a query engine 540 to process and receive the queries. As discussed above queries may be instructions to be executed according to a query plan, but may also be more generally any type of request for data that meets a specified criterion or is generated by a specified process. In some embodiments, a query, or an indication of a query, may include one or more predicate data values that identify select data for processing the query. For example, an SQL query may include predicate data values that specify equality conditions to be met for data to be retrieved, such as "WHERE customer='small' AND customer='medium'." In some embodiments, there may different types of queries. Some types of queries may require filtering on point values (e.g., all records where the state value="Texas"). Other queries may request larger groups of data, such as range queries that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). As query engines 540 are well-known to those of ordinary skill in the art, the previous description is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

Figure 8:
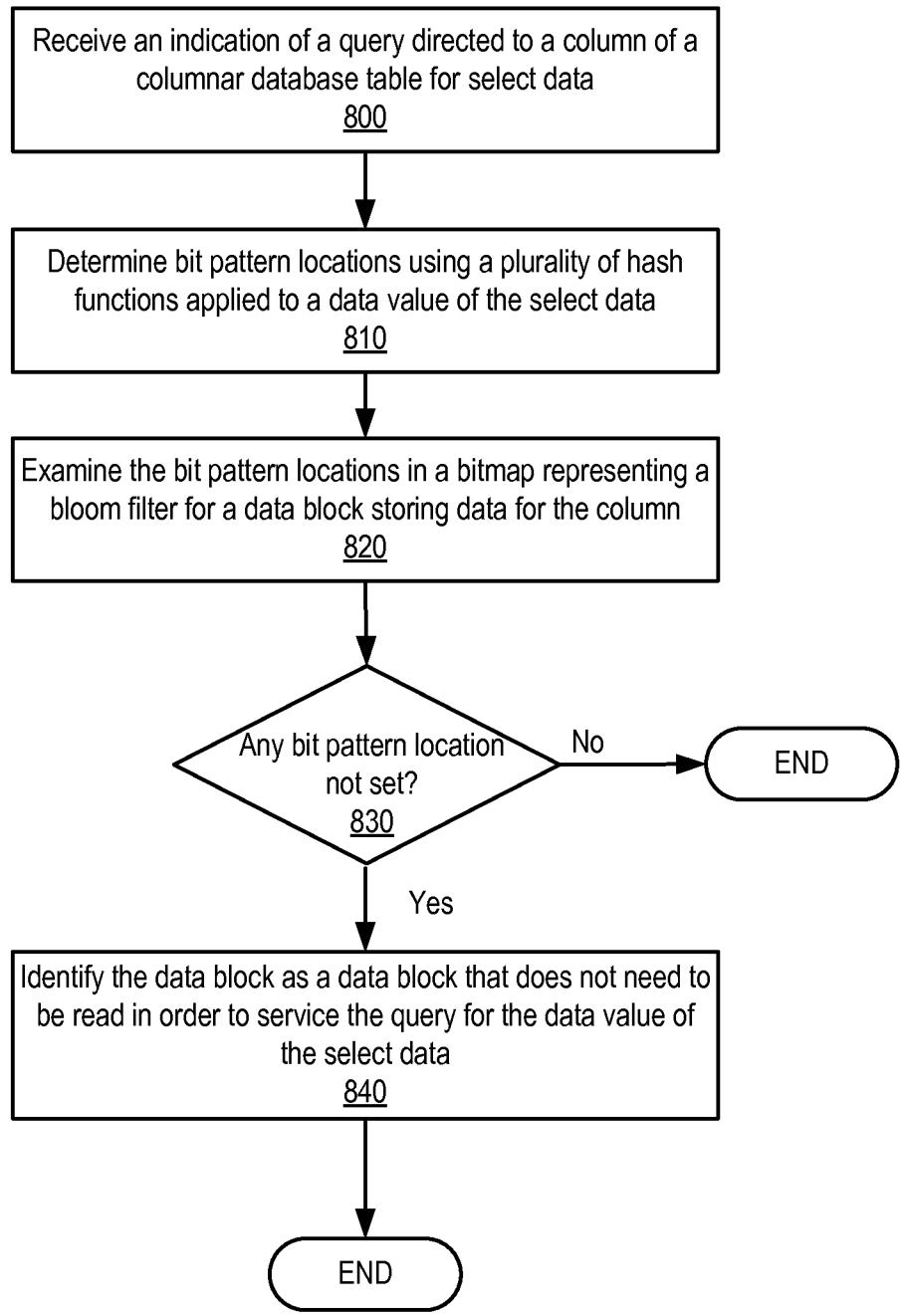
FIG. 8 illustrates a flow chart of a method to examine bloom filters in for processing queries, according to some embodiments.

In some embodiments, therefore, a query engine 520 may receive an indication of a query 504 directed to a column of the columnar database table in storage 530 for select data. Query engine 540 may analyze or examine the bitmap representing the bloom filter for data blocks storing data for the column to determine particular ones of the one or more data blocks which do not need to be read in order to service the query for the select data. For example, in some embodiments query engine 540 may examine the bitmap representing the bloom filter for data blocks containing one or more predicate data values. Query engine 540 may obtain the bitmap for a data block from block metadata 526. FIG. 8, discussed in further detail below, describes some of the various methods and techniques that may be used to examine the bitmap. For example, in some embodiments for a bitmap for a data block may be examined for the data values included in the select data of the query. Different bit patterns may be determined for each of the data values in the select data and then may be examined to determine whether the data block stores the data values. Query engine 540 may then direct read module 550 to read the one or more data blocks storing data for the column except the data blocks which do not need to be read.

In at least some embodiments, data access module 500 may include read module 550. Read module 550 may perform read operations to obtain data from storage 530. In some embodiments, read module 550 may be directed by query engine 540 to read certain data blocks for a column of the columnar database table and return the read data to query engine 540 for further processing. Query engine 540 may then provide at least some of the data in a query response 506 to a storage client, leader node, or other requesting system or device, or process, filter, manipulate, or otherwise change the data read from storage 530 in accordance with the received query. In at least some embodiments, read module 550 may also transfer data read from storage 530 to a database cache (not illustrated) or other module or device part that provides storage for more frequently accessed data when processing queries 504. Query engine 540 may then access the cache or other module with requesting new read operations of the read module 550. As a variety of different caching techniques for data management and storage systems are well-known to those of ordinary skill in the art, the previous examples are not intended to be limiting.

Figure 10:
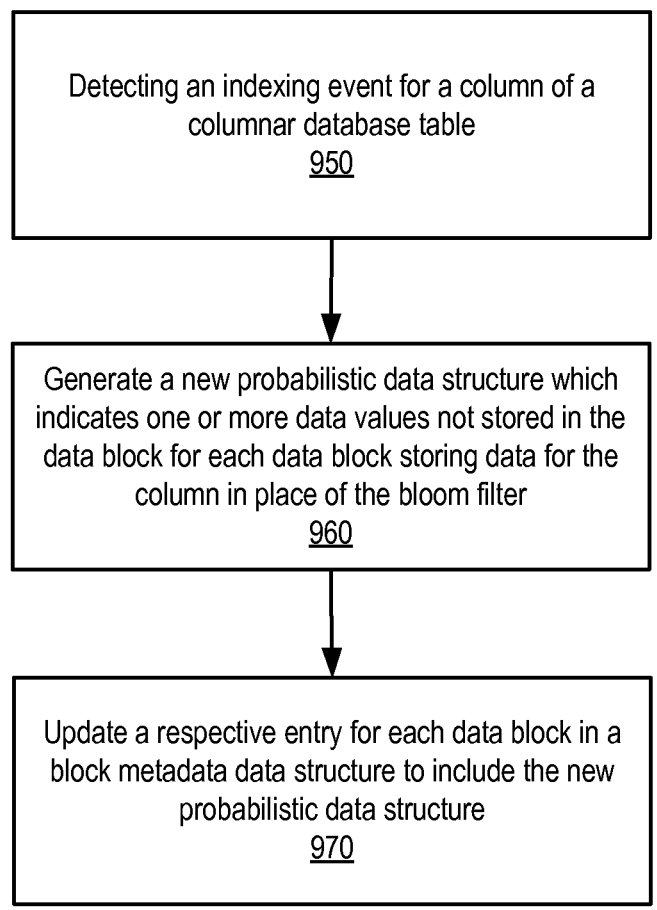
FIG. 10 illustrates a flow chart of a method to detect an indexing event for a column of a columnar database table, according to some embodiments.

Query engine 540 (or another module or component within data access module 500, such as bloom filter generator 510) may be configured to detect indexing events for the column. FIG. 10, discussed in further detail below, describes various methods and techniques to detect an indexing event for a column, such as determining that the selectivity level for some of the bloom filters for the column falls below a selectivity threshold. In response to detecting the indexing event, a new probabilistic data structure may be generated for the data blocks storing data for the column to indicate which data values are likely to be stored in the data block.

Although FIGS. 2 through 5 have been described and illustrated in the context of a distributed data warehousing system, the various components illustrated and described in FIGS. 2 through 5 may be easily applied to other data management systems that provide data management and/or storage services for a columnar database table. As such, FIGS. 2 through 5 are not intended to be limited embodiments in a distributed data warehouse cluster, nor limiting a description of a data storage and management cluster.

Workflow of Processing Queries Using a Height-Balanced Histogram

Figure 6:
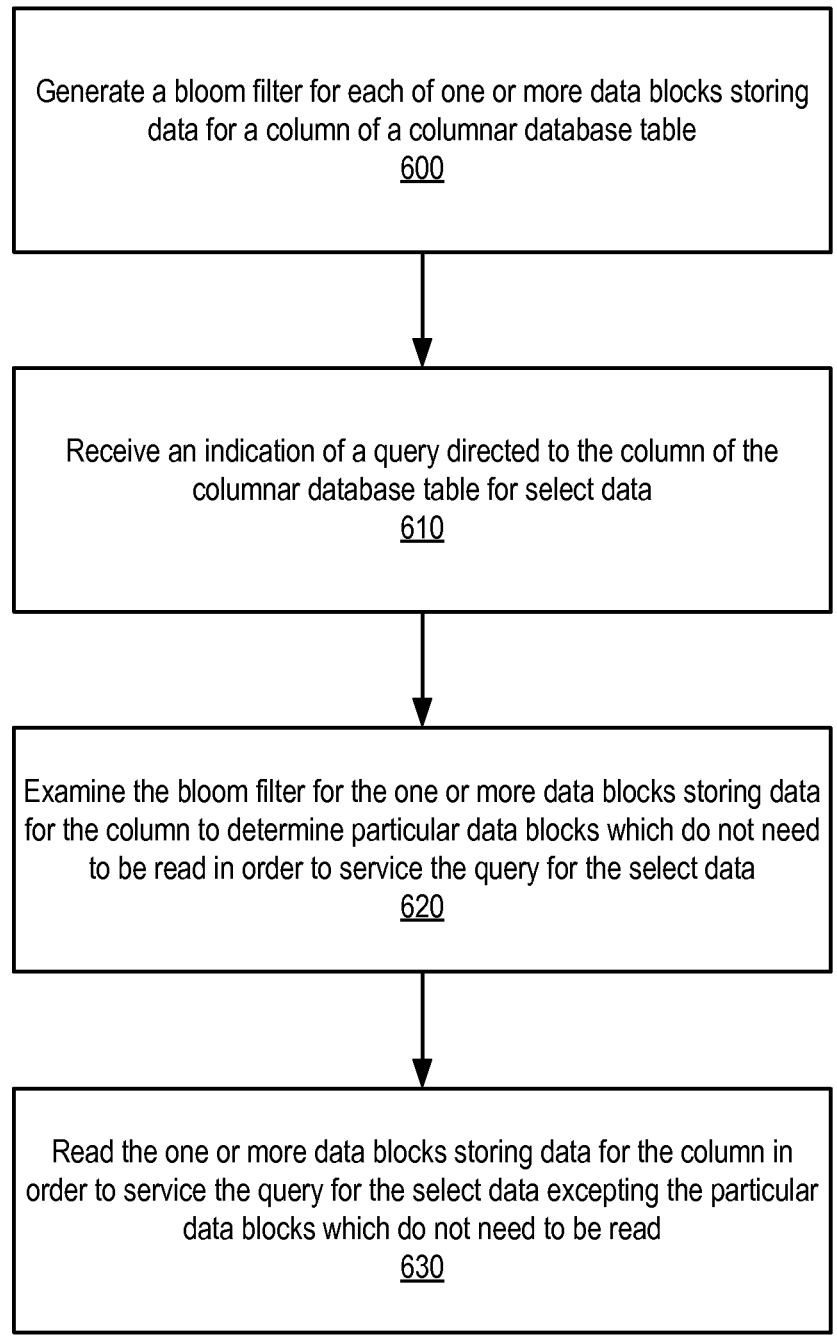
FIG. 6 is a high-level flowchart illustrating a method to process queries using bloom filters for data blocks of a column of a columnar database table, according to some embodiments.

As has been discussed above, database management systems may be configured to utilize columnar database tables to provide more efficient data management functions. In order to more efficiently perform these functions, bloom filters may be generated for data blocks storing data for a column in a columnar database table. FIG. 6 is a high-level flowchart illustrating a method to process queries using bloom filters for data blocks of a column of a columnar database table, according to some embodiments. Various different systems and devices may implement the various methods and techniques described below, either singly or working together. For example, a data access module implementing a bloom filter generator, such as bloom filter generator 510 described above with regard to FIG. 5, and a query engine, such as query engine 540, to implement the various methods. Alternatively, a combination of different systems and devices, such as the multiple compute nodes illustrated in FIG. 3 working together, for example, may also perform the below method and techniques. Therefore, the above examples and or any other systems or devices referenced as performing the illustrated method, are not intended to be limiting as to other different individuals or configurations of systems and devices.

Figure 7:
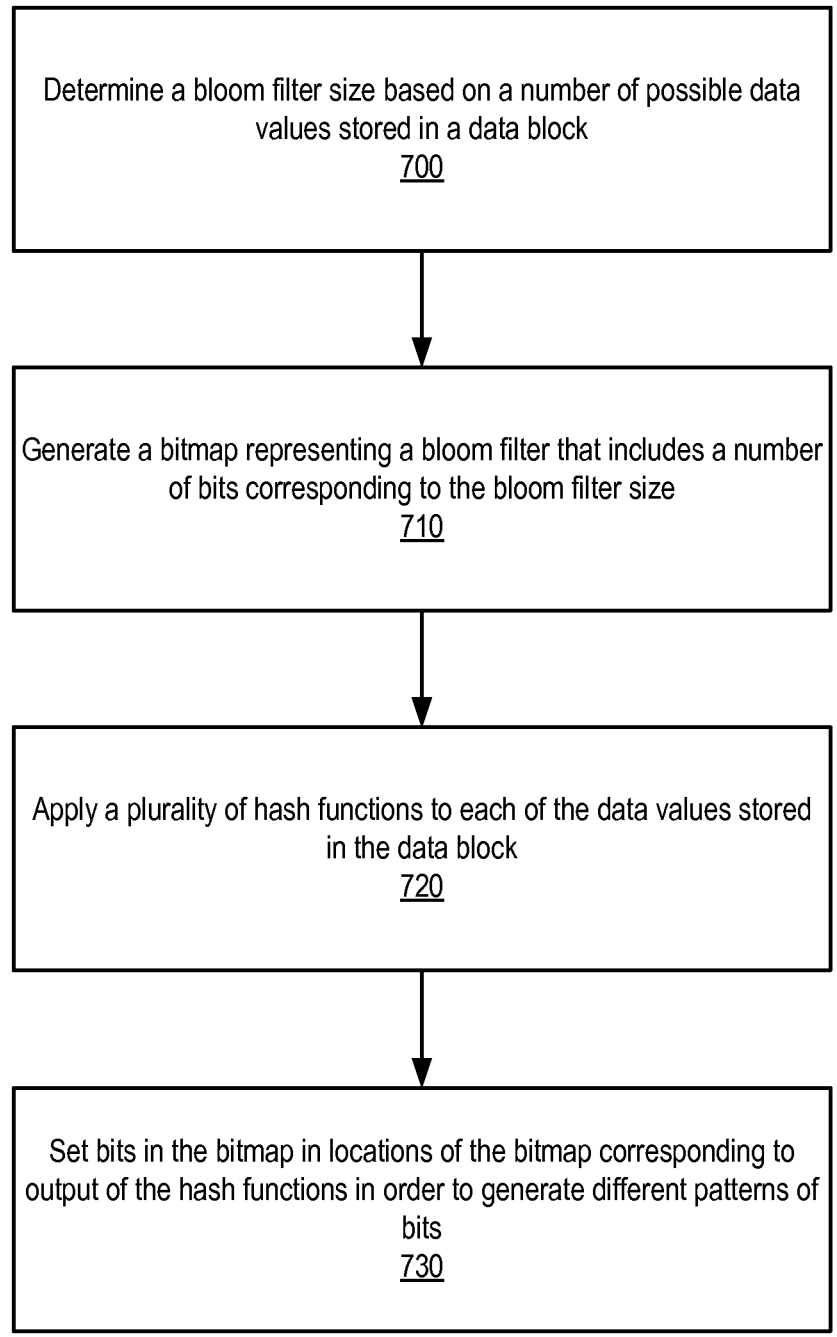
FIG. 7 is a high-level flowchart illustrating a method to generate a bitmap representing a bloom filter for a data block of a column of a columnar database table, according to some embodiments.

In various embodiments, a bloom filter for one or more data blocks storing data for a column of a columnar database table may be generated, as indicated at 600. As discussed above, the bloom filter for a data block may be represented as bitmap. FIG. 7 is a high-level flowchart illustrating a method to generate a bitmap representing a bloom filter for a data block of a column of a columnar database table, according to some embodiments. A bloom filter size may be determined based, at least in part, on a number of possible data values stored in a data block, as indicated at 700. As noted above, data blocks may represent logical or physical blocks of data stored for a column of a columnar database table. As such, the number of possible values that may be stored in a given data block may be determined. For example, if data blocks represent a fixed size of 1 megabyte and a particular data value stored in the column (e.g., integer, char, or string of fixed length) with a known size, it may be determined how many values may be stored in the data block. Based, at least in part, on the number of possible values that may be stored in the data block, the bloom filter size may be determined. For example, in some embodiments, the bloom filter size may be a formula-based determination using the number of possible values stored in the data block. For instance, the number of possible data values stored in a data block, 100, may be multiplied by a factor of 10 to equal a bloom filter size of 1,000. Alternatively, the bloom filter size may be a predetermined value, such as indicated by a database scheme or other formatting information.

A bitmap may then be generated representing the bloom filter for the data block that includes a number of bits corresponding to the bloom filter size, as indicated at 710. The bitmap may be generated as an array of bits. The number of bits may correspond to the bloom filter size, for example by equaling the bloom filter size. However, in some other embodiments, the bloom filter size may have additional bits added to the bloom filter, such as to equal a minimum number of bits. For example, the bloom filter size may be very small and may not meet a minimum number of bits to achieve a certain level of selectivity.

To populate the bitmap with the different patterns of set bits which indicate the data values not stored in the data block and produce the bloom filter, a plurality of hash functions may be applied to each of the data values stored (or to be stored) in the data block, as indicated at 720. Thus, elements 720 and 730 may be performed iteratively or repeatedly for each of the data values to be stored (or stored) in the data block. Hash functions are generally an algorithm or process that maps a larger set of data to a smaller set of data. Hash functions, as used in this specification, may be any hash function that provides a mapping from input data values to a location in the bitmap. Thus, in some embodiments determining the size of the bloom filter may also be determined according to the multiple hash functions applied to the data values. Conversely, in some embodiments, the hash functions applied to the data may be determined based on the size of the bloom filter. As hash functions, are well-known to those of ordinary skill in the art, the previous description is not intended to be limiting as to any particular hash function or set of hash functions to be applied to the data values.

The output of the multiple hash functions applied to the data values of the data block may correspond to locations in the bit map. Thus, if 3 hash functions are applied to the data value, then three corresponding locations of the hash functions may be generated. The corresponding locations in the bitmap may be set (e.g., to a value of "1") in order to generate the different patterns of bits, as indicated at 730.

Figure 9:
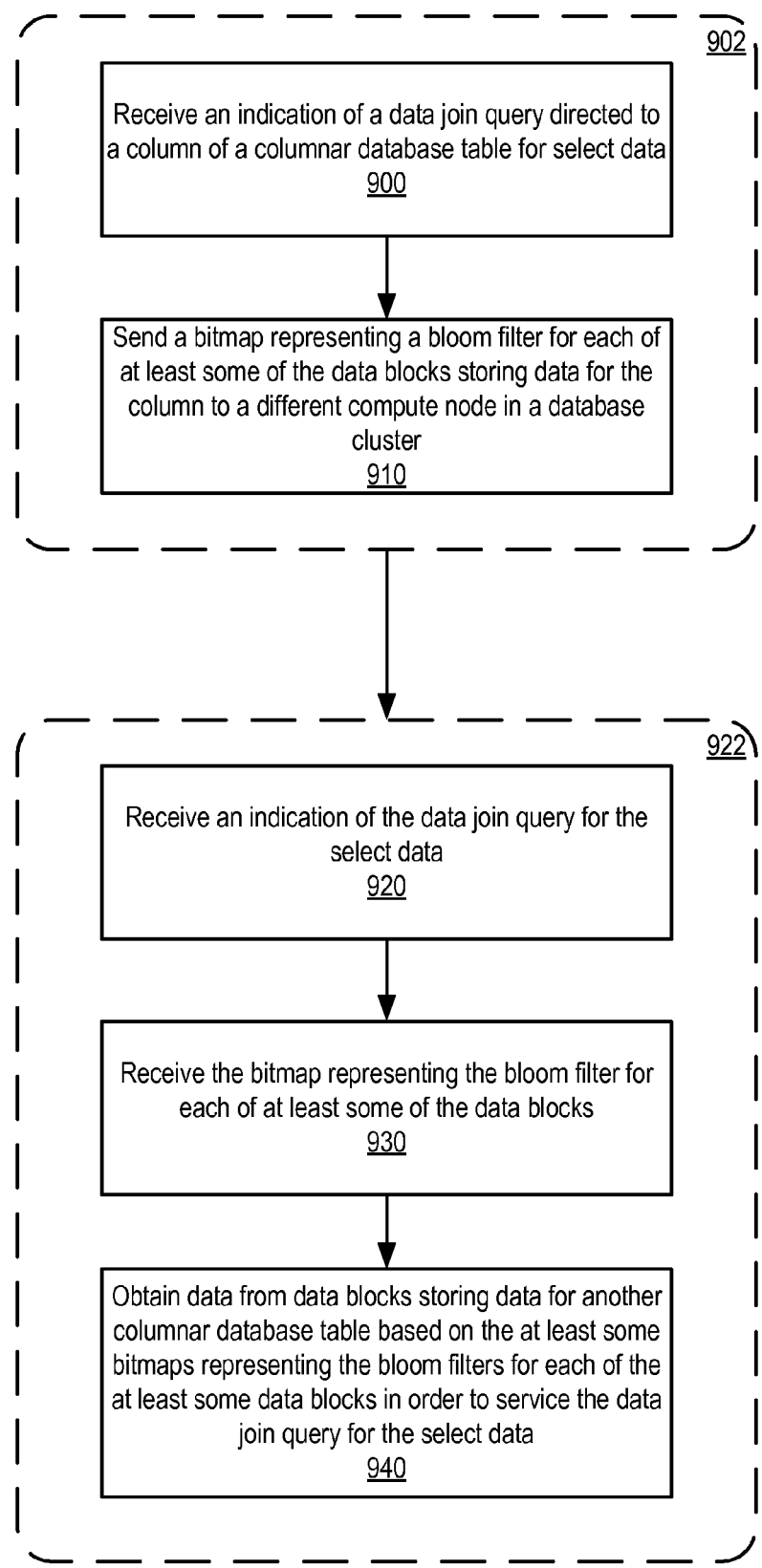
FIG. 9 illustrates a flow chart of a method to process data join queries using bloom filters for data blocks storing data for a column of a columnar database table, according to some embodiments.

Returning to FIG. 6, in at least some embodiments an indication of a query directed to the column of the columnar database table for select data may be received, as indicated at 610. In response, the bloom filter for each of the data blocks storing data for the column may be examined to determine particular ones of the data blocks which do not need to be read in order to service the query for the select data, as indicated at 620, and the data from the one or more data blocks storing the data for the column may be read in order to service the query except the particular ones which do not need to be read, as indicated at 630. FIGS. 8 and 9 discussed below illustrate a few examples of methods and techniques to process queries. FIG. 8 illustrates a flow chart of a method to examine bloom filters for processing queries, according to some embodiments. FIG. 9 illustrates a flow chart of a method to process data join queries using bloom filters for a column of a columnar database table, according to some embodiments.

As indicated at 800, an indication of a query directed to a column of a columnar database table for select data may be received. This query, as discussed above, may be made according to one of many different standard database message protocols, formats, or languages, such as SQL, or, alternatively, may be a customized request, such as according to an API for a system. The query itself may indicate a selection of data that filters data to be obtained or according to one or more single particular values (e.g., point queries such as site analytics for a particular banner ad). The query may also indicate a range of values (e.g., such as those pages of a website with a bounce rate between 50% and 70%). Queries may also include an indication of a data join, discussed further below with regard to FIG. 9. As database queries, languages, and technologies are well-known to those of ordinary skill in the art, the previous examples are not intended to be limiting as to other means and types of queries directed to a database table.

After receiving a query for select data, in some embodiments the bit pattern locations for a data value of the select data may be determined, as indicated at 810, using the hash functions that were used to populate the bloom filter applied to the select data. As discussed above, with regard to element 720 in FIG. 7, multiple different types of hash functions may be applied to the data values. In at least some embodiments, the same hash functions that were used to populate the bloom filter are applied to the data values to determine the bit pattern locations. The output of the hash functions applied to the data values may correspond to locations in the bitmap. Once determined, the bit pattern locations in the bitmap may be examined, as indicated at 820. In at least some embodiments, if all of the bit pattern locations are set (e.g., to a value of "1"), then the data value of the select data may be stored in the data block. The data block may then be read. If, however, at least one of the bit pattern locations is not set (e.g., to a value of "0"), as indicated at 830, then the bloom filter indicates that the data value of the select is not stored in the data block. The data block may then be identified as a data block that does not need to be read in order to service the query for the data value, as indicated at 840. Note that this method, including elements 810 through 840 may be repeated or iterated for other data values of select data requested in a query, and for those other data values the data block may be read if the bit pattern locations are set. Elements 810 through 840 may also be repeated for other data blocks storing data for the column.

As noted above, FIG. 9 illustrates a flow chart of a method to process data join queries using bloom filters for data blocks storing data for a column of a columnar database table, according to some embodiments. Also discussed above, in some embodiments, such as the distributed data warehouse cluster 300 in FIG. 3, data for multiple database tables may be distributed across multiple compute nodes or other systems or storage devices. A data join query may be received that directs a join operation between the data from at least two tables between these devices. In at least some embodiments, the bloom filters generated for the data blocks, as discussed above, may be used to facilitate the join processing, using a technique known as a bloom join. A compute node, or other device, or system, within a larger database system, may perform elements 800 and 810, as indicated at 802. This compute node may receive an indication of a data join query directed to a column of a columnar database table for select data, as indicated at 800. In response, a bitmap representing a bloom filter for one or more of the data blocks in the column may be sent to a different compute node, or other system or device, in a database cluster, as indicated at 810.

A different compute node, or device, or system, within the database system may perform elements 920 through 940, as indicated by the dotted line 922. The other system may also receive an indication of the data join query, as indicated at 920. The bitmaps representing the bloom filters from the other compute node, 902, may be received, as indicated at 930. In response to receiving the indication of the data join query and the bitmaps representing the bloom filters, data may be obtained from data blocks storing data for another columnar database table based on the received bitmaps representing the bloom filters in order to service the data join query for the select data, as indicated at 940. For example, the bloom filters for a given column that contains state values may be sent to another compute node which may then determine whether any of the values in its own database table, for example two states, "California" and "New York", are located in the data blocks represented by the bloom filters. The receiving node may then filter its records according to those records that are might be stored in the data blocks represented by the bloom filters. The bloom filters may also indicate those values which are not stored in the data blocks. For example, "New York" may be indicated as not stored in any of the data blocks represented by bloom filters, and thus, the second compute node may filter out any records related to New York before sending other state records back to the first compute node for further join processing. As data join techniques are well-known to those of ordinary skill in the art, the previous example is not intended to be limiting.

Data values stored in a column may change over time. For example, more data blocks or additional may be added to a column, or the data values stored within a column may change. Use of a database table may also change. For example, the type of database queries predominately directed toward a column of a database table may change from point queries to range queries. In light of this dynamic environment, an indexing event related to determining whether or not to modify or replace altogether the bloom filter may be detected. FIG. 10 illustrates a flow chart of a method to detect an indexing event for a column of a columnar database table, according to some embodiments.

As indicated at 950, an indexing event may be detected for a column of a columnar database table. In at least some embodiments, an indexing event may be detected when the selectivity (e.g., the accuracy or rate of false positives) of at least some of the bloom filters falls below a selectivity threshold. Selectivity for bloom filters may be determined. For example, the number of unset bit locations in a bitmap compared to the number of set bit locations in a bitmap may indicate the selectivity of a bitmap. The number of false positives, when a data block is read for a data value and the data value is not located within the data block, may also be tracked to determine the selectivity for bloom filters. The selectivity level thus determined may then be compared against a selectivity threshold, and if below, an indexing event may be triggered. The number of bloom filters that fail to meet this threshold may vary in some embodiments. In at least some embodiments, the selectivity level of a single bloom filter falling below the selectivity threshold may trigger an indexing event.

In at least some other embodiments, as queries (or indications of queries) are received, the type of each query and the number for each type of query received may be determined. For example, it may be determined that 70% of queries directed toward a column of a columnar database table may be range queries. In some embodiments, if the number of range queries exceeds a query type threshold, then an indexing event may be triggered. Continuing with the previous example, if the query type threshold is 60%, then an indexing event for the column may be triggered. Other query types or amounts of queries for a query type threshold may be used instead of range queries.

Upon detecting an indexing event, a new probabilistic data structure may be generated for the data blocks of the column, as indicated at 960. As discussed above, a probabilistic data structure may indicate whether a given value is likely within a set of values. Many other types of probabilistic data structures may be used, including but not limited to quotient filters, skip lists, random trees.

In at least some embodiments, a new probabilistic data structure may be generated by using the data values stored for the column to create a histogram. A histogram may be generated based, at least in part, on the data values of the data blocks stored in the column. To determine the bucket range sizes of the buckets (representing the ranges of values in the histogram), data of the column from the data blocks may be obtained. Then multiple buckets may be generated, which may be significantly more than the number of values that may be stored in the data block. A bucket range size may be set for the buckets such that the data of the column is evenly distributed among the buckets. For example, a retailer may store demographic information, such as age, about customers who purchase goods from the retailer over a certain period of time in a column of a columnar database table. If the ages of customers were highly concentrated at a certain age range (e.g., 45 to 60 years old) with the rest of customer ages more spread out, a histogram with even bucket size ranges (e.g., 10 years) might have 2 buckets, 40-50 and 50-60 with high numbers and the other buckets with much smaller numbers of customers. Instead, the bucket range sizes may be varied in bucket range size, such that some bucket ranges may contain ages 0-25, while others may be smaller 45-47, such that the number of customers represented in each bucket is evenly distributed across all of the buckets.

A bitmap may be generated for each data block based, at least in part, on the bucket range sizes. These bitmaps may indicate for which buckets a data value is within the range of values represented by the bucket and stored within a data block. Each bit of the bitmap may correspond to a bucket of the histogram. Set bits indicate that a data value within the range of the bucket is stored within the data block. Thus if, for example, a query is being processed and the bitmap is examined for certain data values, if the bit of the bitmap representing a bucket that contains the data value sought in the query is set, then it is possible that the data value may be stored in the data block. If not, then the data block may not need to be read.

As indicated at 970, the respective entries for the data blocks with new probabilistic data structures may be updated to include the new probabilistic data structures. When, for example, queries for select data are received, the new probabilistic data structures may be used to determine whether a data block should be read in order to service the query.

The previous flowcharts illustrated in FIGS. 6 through 10 are intended to provide examples of the various techniques or methods used to efficiently process queries using bloom filters for a column of a columnar database table. Additional or different elements may be added to the Figures. Other arrangements or orderings of the elements may also be performed.

Example System

Embodiments of efficient query processing using a bloom filter for data blocks for a column of a columnar database as described herein may be executed on one or more computer systems, which may interact with various other devices. One such computer system is illustrated by FIG. 11. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for scaling computing clusters in distributed systems as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 11:
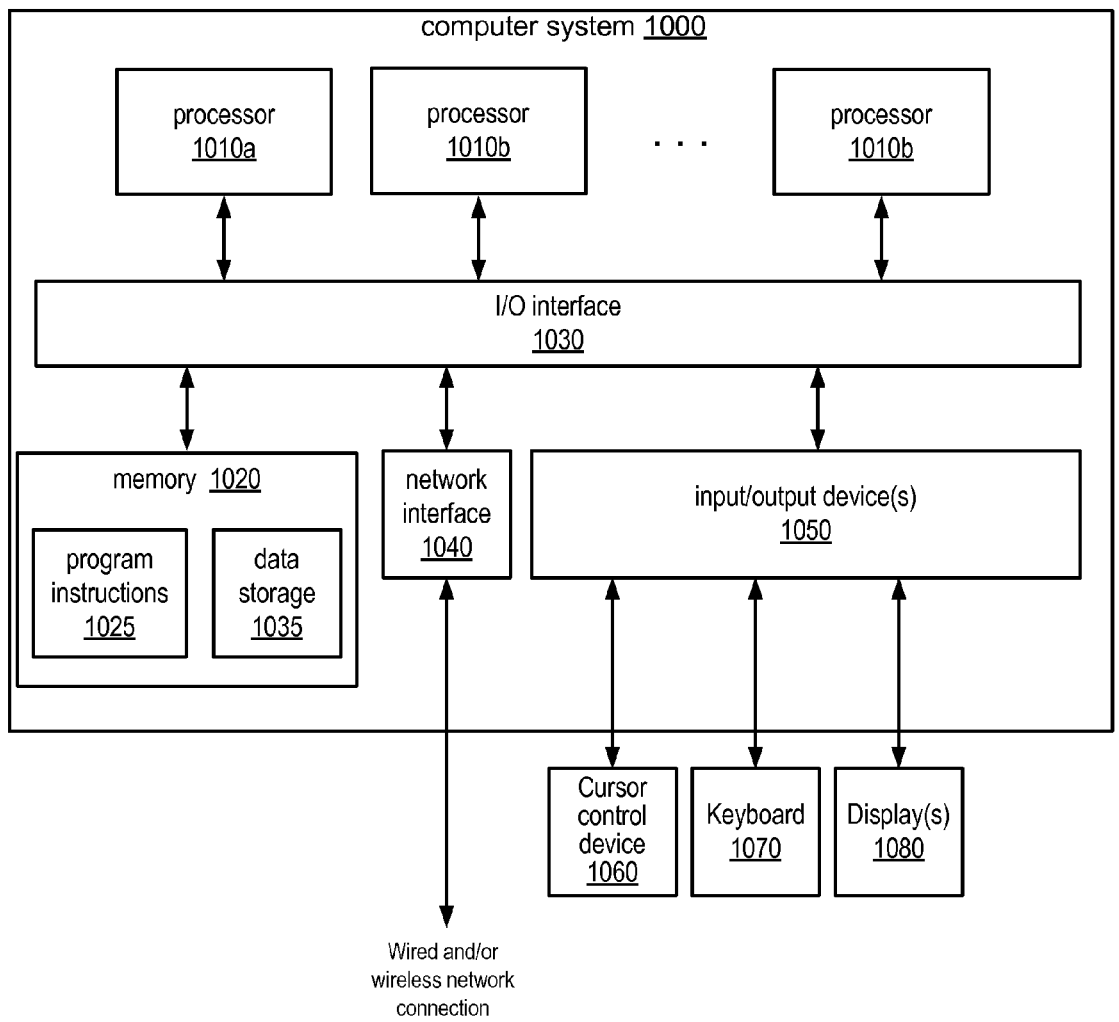
FIG. 11 illustrates an example system, according to some embodiments.

As shown in FIG. 11, memory 1020 may include program instructions 1025, configured to provide efficient query processing using a bloom filter for data blocks for a column of a columnar database, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed data warehouse system, comprising:
a plurality of nodes, wherein at least some nodes of the plurality of nodes each comprise:
storage for a columnar database table, wherein said storage comprises a plurality of data blocks; and
a data access module;
the data access module, configured to:
generate a probabilistic data structure for each of one or more data blocks storing data for a column of the columnar database table, wherein each probabilistic data structure indicates data values not stored in the data block;
receive an indication of a query directed to the column of the columnar database table for select data; and
in response to the receipt of the indication of the query, examine the probabilistic data structure for each of the one or more data blocks storing data for the column to determine particular ones of the one or more data blocks which do not need to be read in order to service the query for the select data.

2. The system of claim 1, wherein the data access module is further configured to:
receive additional data to be stored in an additional data block for the column of the columnar database table; and
generate an additional probabilistic data structure for the additional data block.

3. The system of claim 1, wherein to generate the probabilistic data structure for each of the one or more data blocks storing the data for the column of the columnar database table, the data access module is configured to:
generate a bitmap representing the probabilistic data structure and comprising a plurality of bits; and
populate the bitmap with the different patterns of set bits based, at least in part, on the data stored in the data block to produce the probabilistic data structure.

4. The system of claim 1, wherein the one or more nodes of the plurality of nodes are one or more compute nodes of a data warehouse cluster, wherein a different node of the plurality of nodes is a leader node of the data warehouse cluster, and wherein the leader node is configured to send one or more queries directed to the column of the columnar database table to the one or more compute nodes.

5. A method, comprising:
performing, by one or more computing devices:
generating a probabilistic data structure for each of one or more data blocks storing data for a column of a columnar database table, wherein each probabilistic data structure indicates data values not stored in the data block;
receiving an indication of a query directed to the column of the columnar database table for select data; and
in response to receiving the indication of the query, examining the probabilistic data structure for each of the one or more data blocks storing data for the column to determine particular ones of the one or more data blocks which do not need to be read in order to service the query for the select data.

6. The method of claim 2, wherein said generating the probabilistic data structure for each of the one or more data blocks storing the data for the column of the columnar database table comprises:
generating a bitmap representing the probabilistic data structure and comprising a plurality of bits; and
populating the bitmap with the different patterns of set bits based, at least in part, on the data stored in the data block to produce the probabilistic data structure.

7. The method of claim 6, wherein said examining the probabilistic data structure for each of the one or more data blocks comprises:
for a given data block:
for each data value of the select data:
determining bit pattern locations corresponding to the data value; and
examining the bit pattern locations in the bitmap representing the probabilistic data structure for the given data block to determine whether the given data block is one of the particular ones which do not need to be read in order to service the query for the select data.

8. The method of claim 5, further comprising in response to receiving the indication of the query, reading the data from the one or more data blocks storing data for the column in order to service the query for the select data excepting the particular ones of the one or more data blocks which do not need to be read.

9. The method of claim 5, wherein the data for the column of the columnar database table is unsorted.

10. The method of claim 5, further comprising for each of the one or more data blocks, storing the probabilistic data structure in a respective entry in a block metadata data structure that stores information about the one or more data blocks.

11. The method of claim 5, further comprising:
  receiving additional data to be stored in one of the one or more data blocks for the column of the columnar database table; and
  updating the probabilistic data structure for the one data block to include the additional data.

12. The method of claim 5, wherein the indication of the query further indicates that the query is a data join query, wherein the plurality of computing devices are part of a larger collection of computing devices implementing a database cluster in a distributed data warehouse system, wherein the plurality of computing devices implement a compute node of the database cluster, wherein another plurality of computing devices that are part of the larger collection of computing devices implement a different compute node storing another columnar database table, and wherein the method further comprises:
  performing, by the compute node:
    in response to receiving the indication of the query, sending the probabilistic data structure for each of at least some of the one or more data blocks to the different compute node;
  performing, by the different compute node:
    receiving the indication of the data join query for the select data;
    receiving the probabilistic data structure for each of the at least some of the one or more data blocks from the compute node; and
    in response to receiving the indication of the data join query and receiving the probabilistic data structure for the at least some of the one or more data blocks, obtaining data from data blocks storing data for the other columnar database table based, at least in part, on the the probabilistic data structure for each of the at least some data blocks in order to service the data join query for the select data.

13. The method of claim 5, further comprising:
  detecting an indexing event for the column of the columnar database table; and
  in response to detecting the indexing event:
    for each of the one or more data blocks, generating a new probabilistic data structure which indicates one or more data values not stored in the data block in place of the probabilistic data structure.

14. The method of claim 13, wherein said detecting an indexing event for the column of the columnar database table comprises:
  for each of the one or more data blocks, evaluating the probabilistic data structure for the data block to determine a selectivity level for the bitmap; and
  determining that the selectivity level for at least some of the one or more data blocks is below a selectivity efficiency threshold.

15. The method of claim 13, further comprising:
  receiving a plurality of indications of a plurality of different queries directed to the column of the columnar database table; and
  wherein said detecting an indexing event for the column of the columnar database table comprises analyzing the plurality of different queries to determine that a number of the queries are range queries and that the number of range queries exceeds a query type threshold.

16. A non-transitory, computer-readable storage medium, storing program instructions that when executed by one or more computing devices implement:
  generating a probabilistic data structure for each of one or more data blocks storing data for a column of a columnar database table, wherein each probabilistic data structure indicates data values not stored in the data block;
  for each of the one or more data blocks, storing the probabilistic data structure in a respective entry for the data block in a block metadata data structure that stores information about the one or more data blocks;
  receiving an indication of a query directed to the column of the columnar database table for select data; and
  in response to receiving the indication of the query:
    analyzing the probabilistic data structure for each of the one or more data blocks storing data for the column to determine particular ones of the one or more data blocks which do not need to be read in order to service the query for the select data; and
    reading the one or more data blocks storing data for the column in order to service the query for the select data excepting the particular ones of the one or more data blocks which do not need to be read.

17. The non-transitory, computer-readable storage medium of claim 16, wherein, in said generating the probabilistic data structure for each of the one or more data blocks storing data for the column of the columnar database table, the program instructions when executed by the one or more computing devices implement:
  generating a bitmap representing the probabilistic data structure and comprising a plurality of bits corresponding to the probabilistic data structure size; and
  populating the bitmap representing the probabilistic data structure based, at least in part, on the data values stored in the data block.

18. The non-transitory, computer-readable storage medium of claim 17, wherein, in said examining the probabilistic data structure for each of the one or more data blocks storing data for the column to determine particular ones of the one or more data blocks which do not need to be read in order to service the query for the select data, the program instructions when executed by the one or more computing devices implement:
  for a given data block:
    for each data value of the select data:
      determining bit pattern locations according to the data value; and
      examining the bit pattern locations in the bitmap representing the probabilistic data structure for the given data block to determine whether the given data block is one of the particular ones which do not need to be read in order to service the query for the select data.

19. The non-transitory, computer-readable storage medium of claim 16, wherein the program instructions when executed by the one or more computing devices further implement:
  detecting an indexing event for the column of the columnar database table; and
  in response to detecting the indexing event:
    for each of the one or more data blocks, generating a new probabilistic data structure which indicates one or more data values not stored in the data block in place of the probabilistic data structure.

20. The non-transitory, computer-readable storage medium of claim 16, wherein the data for the column of the columnar database table is unsorted.

* * * * *